Dec. 27, 1966     C. L. HINKSON     3,293,791
FISHING GEAR
Filed Oct. 12, 1964
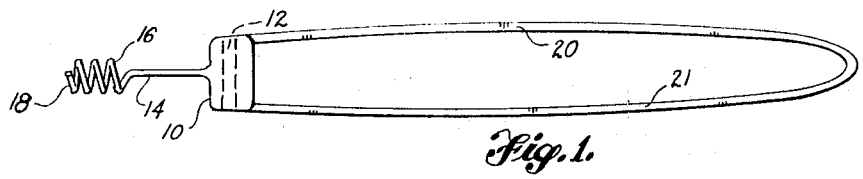
Fig. 1.
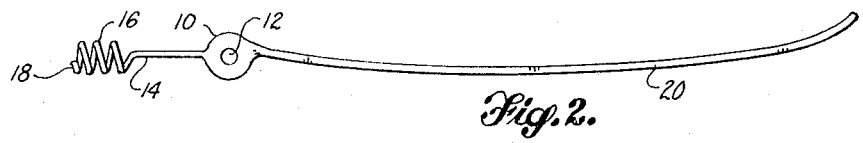
Fig. 2.
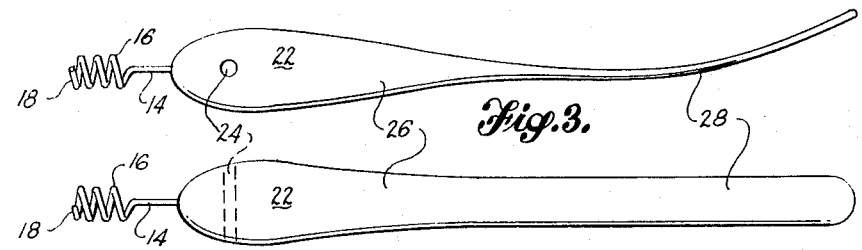
Fig. 3.
Fig. 4.
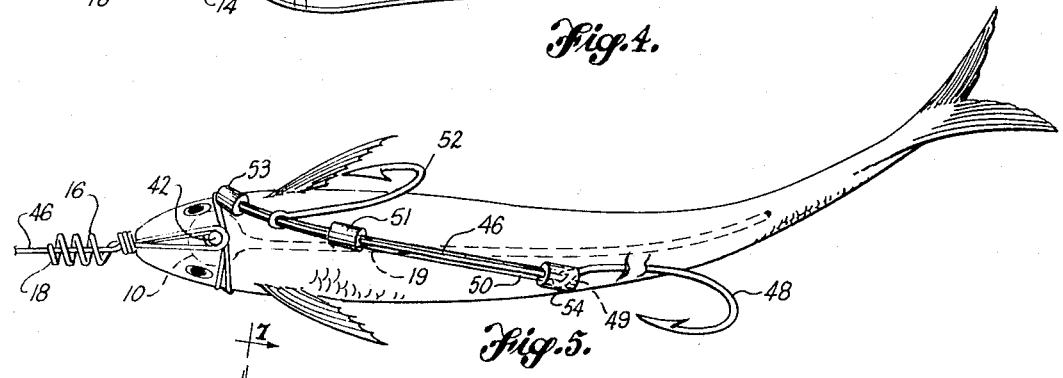
Fig. 5.
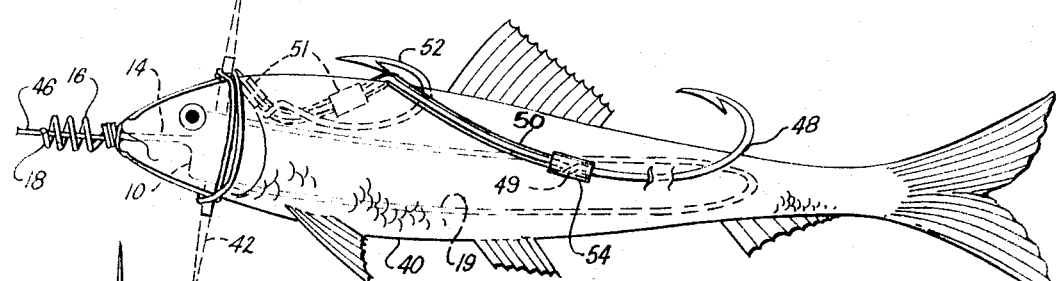
Fig. 6.
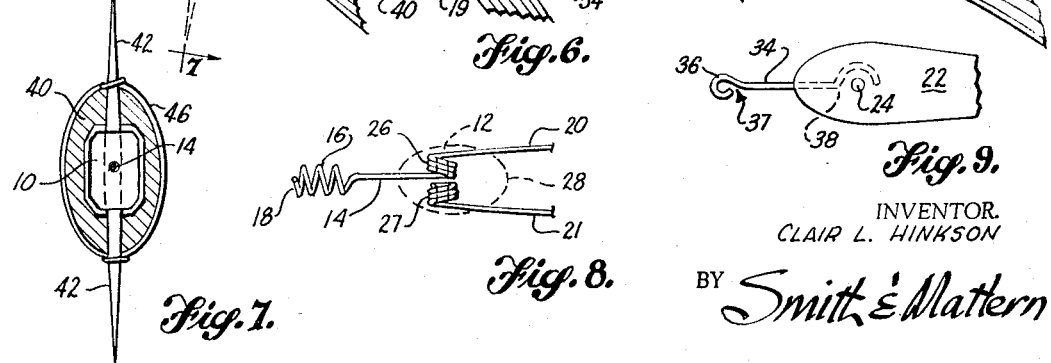
Fig. 7.     Fig. 8.     Fig. 9.
INVENTOR.
CLAIR L. HINKSON
BY *Smith & Mattern*
ATTORNEYS United States Patent Office 3,293,791
Patented Dec. 27, 1966

3,293,791
FISHING GEAR
Clair L. Hinkson, Rte. 5, Box 389–C,
Olympia, Wash. 98501
Filed Oct. 12, 1964, Ser. No. 403,032
10 Claims. (Cl. 43—44.4)

This invention relates to fishing gear for use with small bait fish and is particularly concerned with apparatus insertable into the mouth end of a bait fish to stiffen and shape it and for guiding and anchoring a leader or snood to the bait fish in advance of fish hooks normally impaled in and carried by the bait fish.

While this invention is particularly adaptable for use in fishing for salmon and other salt water fish wherein herring are used as the bait fish, it is likewise useful in fresh water fishing for hooking up minnows, water dogs and other form of natural bait. This description will concern the use of this invention as applied in salmon fishing.

Gear or apparatus heretofore proposed is not particularly successful in hooking-up the herring in such manner that attachment is secure and the bait fish retains an appearance effective to attract predatory fish such as salmon. A popular theory with salmon fishermen is that a bait fish must have an action in the water that simulates a crippled herring. It is therefore an important object of this invention to provide apparatus which, when attached to a herring or minnow, maintains the natural appearance of the bait fish but improves both the attachment to the minnow in an inconspicuous manner and the minnow's action in such a way that it does not warn an attacking predatory fish by reason of unnaturalness of appearance or of action.

Another object of this invention is to provide an attachment for joining a bait fish to a fishing line wherein appreciable weight may be imparted to the bait fish within its body to obviate the necessity of supplying weights to the line separate from the bait to insure that the bait is carried to desired depths in the water.

A still further object of this invention is to provide a bait fish attachment with a tail portion which may be inserted into the visceral cavity of the bait fish to stiffen and shape the bait fish body and, when bent or curved, to impart curvature or twist to the bait fish to enhance its action and appearance in simulation of a crippled herring.

These objects and others of this invention will become more apparent during the course of the following description in which has been set forth, preferred and alternate forms of the invention.

In general, the attachment means of this invention comprises a head member adapted to be disposed in the mouth region of a bait fish. A passage is formed through the head member and an elongated pin is insertable through the passage and extends oppositely from the head of the bait fish. The through passage of the head member may be either transverse or, preferably, upright relative to the bait fish. A forward extending line guide is carried by the head member for disposition in front of the bait fish's mouth. A snood or leader is anchored by being wrapped or wound around the extending ends of the elongated pin and the gills and mouth of the head of the bait fish. The leader passes forwardly through the line guide to the trolling or fishing line. The snood rearwardly of its anchor has hook means which are normally impaled through the skin and body of the bait fish and so disposed that they stand outwardly in a fish-catching position. The head member may also have a tail member extending rearwardly from it. Such a tail member may be blade-like or it may be in the form of a wire loop. It is preferable that the tail member be manually pliable so that it can be formed to impart a curve or a straight line for internal stiffening and shaping of the bait fish. Normally the tail member will extend rearwardly approximately to the vent of the bait fish, having been inserted into the bait fish through its mouth.

The invention is fully disclosed in the following description considered in connection with the accompanying drawings, in which:

FIGURE 1 is a view in side elevation of a bait fish apparatus embodying the invention;
FIGURE 2 is a plan view of the apparatus of FIGURE 1;
FIGURE 3 is a plan view of an alternate form of the baiting apparatus;
FIGURE 4 is a view in side elevation of the apparatus in FIGURE 3;
FIGURE 5 is a top plan view of a bait fish, hooked up and ready for use in a fishing operation;
FIGURE 6 is a side view of the bait fish of FIGURE 5;
FIGURE 7 is a cross-sectional view taken in line 7—7 of FIGURE 6;
FIGURE 8 is a detail view, partially in section of a modified head member of the apparatus of FIGURE 1; and
FIGURE 9 is a detailed view of a nose portion of the apparatus of FIGURE 3 showing an alternate line guide.

Referring particularly to FIGURES 1 and 2, the bait fish insert includes a head member 10 having a through passage 12. A forwardly extending shank 14 in advance of a head member 10 supports a line guide 16. In this instance the line guide 16 is shown as a wire helix formed integrally on the forward end of the shank 14. It will be apparent that the line guide may be formed of but a single loop as more fully described hereafter. The terminal 18 of the helix preferably lies closely alongside of the last preceding complete loop with such spacing to normally require that the terminal end 18 be sprung slightly as the line passes between the parts described. This reduces unintentional withdrawal of the line from the leader.

In the FIGURES 1 and 2 conformation, a tail member extends rearwardly from the head member 10. The tail is a wire loop having legs 20, 21 that are malleable or pliable to such an extent that the tail member is capable of being manually worked to either straighten it or to impart a curvature to it as may be desired by the fisherman. Such a curvature in the tail member is shown in FIGURE 2.

Referring to FIGURE 8, wherein the head member is shown in phantom, the manner of forming the internal structure of the head is disclosed. The forward end of shank 20 is tightly coiled at 26 to form approximately four loops lying close together. The innermost loop then extends forwardly to form shank 14. In similar manner the forward end of wire 21 is likewise tightly coiled at 27, although the forward extending shank is omitted. In manufacture the two coils 26, 27 the interior of which form the through passage 12, are held in close juxtaposition and preferably are coated with molten lead on the outside of the coils to fuse the same together and form head 10, FIGURE 1, and also to provide body weight which will ultimately be disposed within the bait fish. In FIGURE 8, showing a modified head, the head 28 shown in phantom is ellipsoidal and larger than head 10 of FIGURE 1. This increases the body weight. Of course various sizes may be formed as desired.

In FIGURES 3 and 4 an alternate form of the insert gear is illustrated. Head member 22, having through passage 24, is streamlined at 26 in its rearward extension and merges with an integral tail blade 28. Line guide 16, as previously described, is carried on the forward end of the body 22 by shank 14. It is desirable that the body 22 and the tail 28 be molded of lead to impart appreciable weight to the minnow for purposes later to be described.

With this form of insert gear the usual line weight may be dispensed with. In FIGURE 9 may be seen another style of line guide in which the shank 34 has eye 36 on its forward end. At 37 a restricted space is provided so that a leader or snood may be snap-inserted into the eye 36. The rear end of the shank 34 is embedded in head 22 of the gear. To insure a firm embedding of the same, a coil 38 is cast in place when the body 22 is formed.

Referring to FIGURES 5 and 6, a herring 40 has apparatus according to FIGURES 1 and 2 inserted therein through the mouth. The line guide 16 is disposed slightly in advance of the bait fish's mouth and the terminal end of loop 19 passes through the visceral cavity and is located approximately at the vent of the herring. Lateral curvature of the loop 19 near the rear of the tail portion 19 causes the herring body to curve to one side as can be seen in FIGURE 5. Tail portion 19 may also be twisted in which case the bait fish's body would likewise twist or spiral. The loop 19 stiffens as well as shapes the body of the herring. One elongated pin such as a toothpick 42 is inserted vertically through the head of the herring passing through opening 12, its ends extending above and below the herring as shown. Leader or snood 46 carries on its rear end a hook 48 and is knotted at 49 within a collar 54 for a secure anchor. In advance of the knot 49 the leader passes through a tough plastic tube 50 of small diameter which protects the leader from being bitten through by the predatory fish. A collar 51 formed of a short section of plastic tubing slides on tube 50 but not very freely. A second hook 52 may be slidably mounted on the leader encasing tube 50 in advance of collar 51. A forward collar 53 may also be used.

When the insert apparatus is appropriately located within the bait fish and the pin 42 is inserted as shown, the fisherman next impales hook 48 in the rear side of the bait fish, slightly in advance of its tail as shown in FIGURES 5 and 6. Impaling is accomplished by inserting the barbed point through the skin and into the flesh of the fish and then back out. The shank of the hook lies forwardly. The leader 46 then passes from its knotted attachment to the shank eye 49 of hook 48 diagonally across the back of the herring. Hook 52 may likewise be impaled in the other side of the herring so that its barbed end stands outward and slightly upward. The leader then is wound around the extending ends of the pin 42, usually by making a double wrap around the head of the herring on the back side of pin 42. This holds the gills closed. Then the leader is brought either from the belly side of pin 42, or the head side, to the nose of the fish and wrapped around the shank of the line guide, then back and around the opposite protruding end of pin 42. This secures the mouth of the herring closed. Thereafter it is desirable to wrap the leader or shank two or three times around the shank 14 of the line guide. It is then wrapped between the coils of the helix 16, snapping it between the last of such coils and the terminal end 18. This results in the leader 46 being disposed approximately at the axis of the line guide 16. Alternatively, with a line guide as shown in FIGURE 9, the leader is either threaded through the eye 36 or by being inserted through the restricted passage 37, snapped into the eye 36.

When the leader 46 has been anchored or secured to the herring around the protruding ends of pin 42 in the manner described the excess of such ends may be snipped off fairly close to the wraps of the leader, as indicated in dotted lines in FIGURE 6. The bait fish is thus made ready for use in the water.

When the gear shown in FIGURES 3 and 4 is used it will be apparent that a considerably greater weight is applied within the herring than is the case with the gear in FIGURES 1 and 2, due to the fact that the former is desirably formed as an integral body of cast lead.

With either apparatus however the fisherman may either before or after insertion of the apparatus into the herring, manually shape the trailing portion of the insert member as he thinks best to curve it more, or to straighten it from a curved condition. Depending upon the condition of the bait, the fisherman may also manually bend the trailing portion of the apparatus or straighten it after it has been inserted in the herring.

It will be readily apparent to fishermen who are experienced in the use of bait fish, and particularly salmon fishermen who commonly use herring as their bait, that this gear provides several advantages. It provides means for anchoring or securing the leader to the bait fish in the head region which usually has the greatest body structure. The passage of pin 42 through this head area, the principal bony structure of the bait fish, insures secure attachment of the bait fish. In distinction to other baiting devices, wherein the pull on the leader is imparted directly to an insert relatively loosely attached to fish, in this case the lead is securely anchored to the head member 10 or 22 of the insert in the manner described. By wrapping the leader around the protruding ends of pin 42 it is insured that the gills and the mouth of the bait fish are firmly and securely closed against the entrance of water which would otherwise tend to reduce the lifelike appearance of a bait fish or distort or tear it when it is subjected to forceful action of the water. Further, the primary and sole function of the bait fish, in addition to attracting the predatory fish, is merely to carry a couple of hooks to which no force is applied until a fish strikes. In such instance, assuming that hook 52 is engaged, the front hook may slide rearward on the leader tube 50. This may force collar 51 rearward against the protected knot at eye 49, which may likewise be encased in a collar 54 that tends to prevent the knot 49 from being abraded or otherwise stressed.

Tube 50 is preferably formed of small diameter tough, flexible nylon or similar polymeric material. Desirably it functions when wrapped around the bait fish to locate the forward hook but also to bind the belly of the bait fish to the internal shaping and stiffening tail member 19 or 28.

What is claimed is:

1. Gear for use with small bait fish, comprising:
   a head member adapted to be disposed in the mouth region of a bait fish and having a through passage;
   a line guide carried by said head member for disposition in advance of the head of a bait fish;
   an elongated pin insertable through said passage to extend oppositely from the head of a bait fish; and
   a snood to be wrapped around and anchored to the extending ends of said pin and pass forwardly through the line guide; and
   hook means on said snood rearward of its attachment to said pin to be engaged in and carried by bait fish.

2. The structure according to claim 1 in which the line guide comprises a wire shank extending forwardly from the head member and terminating in a helix.

3. The structure according to claim 1 in which the through passage of the head member is disposed upright in the mouth region of a bait fish and the elongated pin extends oppositely above and below the head of the bait fish.

4. The structure according to claim 1 in which the hook means comprises two single barbed hooks, one of which is anchored at the end of the snood and the other of which is freely slidable therealong.

5. The structure according to claim 1 in which the head member comprises a lead body to apply appreciable weight to a bait fish when disposed therein.

6. The structure according to claim 1 in which the head member is ellipsoidal and is formed of lead and supplies appreciable weight to a bait fish when disposed therein.

7. The structure according to claim 1 in which the head member has a rearwardly projecting relatively thin, malleable tail member, devoid of hooks or protuberances, for insertion into the visceral cavity of the bait fish to stiffen the rear portion of the bait fish body.

8. The structure according to claim 7 in which the tail member is a wire loop.

9. The structure according to claim 7 in which the tail member is blade-like.

10. Gear for use with small bait fish, comprising:
- a head member adapted to be disposed in the mouth region of a bait fish and having a through passage;
- a line guide carried by said head member for disposition in advance of the head of a bait fish;
- a malleable tail member extending rearwardly from said head member for insertion into the visceral cavity of the bait fish to stiffen and shape the rear portion of the bait fish body;
- an elongated pin insertable through said passage to extend oppositely from the head of a bait fish;
- a snood to be wrapped around and anchored to the extending ends of said pin and to pass forwardly through the line guide; and
- hook means on said snood rearward of its anchor to said pin to be engaged in and carried by a bait fish.

References Cited by the Examiner

UNITED STATES PATENTS

| | | | |
|---|---|---|---|
| 2,192,800 | 3/1940 | Peterson | 43—44.4 |
| 2,565,956 | 8/1951 | Duhamel | 43—44.4 |
| 2,860,443 | 11/1958 | Robinson | 43—44.4 |
| 2,880,545 | 4/1959 | Stadler | 43—44.2 X |
| 2,894,351 | 7/1959 | Doane | 43—44.4 |
| 2,916,846 | 12/1959 | Smith | 43—44.4 |
| 3,218,752 | 11/1965 | Zielaskowski | 43—44.2 |

ALDRICH F. MEDBERY, *Acting Primary Examiner.*

SAMUEL KOREN, *Examiner.*

D. J. LEACH, *Assistant Examiner.*